(12) United States Patent
Goldberg et al.

(10) Patent No.: US 7,487,744 B1
(45) Date of Patent: Feb. 10, 2009

(54) MULTI-SPECIES ANIMAL CAGING MODULES

(75) Inventors: Michael L. Goldberg, Wheatland, WY (US); Dwight L. Souder, Wheatland, WY (US); Cindy M. Adamson, Wheatland, WY (US); David E. James, Wheatland, WY (US)

(73) Assignee: BH, Inc., Wheatland, WY (US)

( * ) Notice: Subject to any disclaimer, the term of this patent is extended or adjusted under 35 U.S.C. 154(b) by 326 days.

(21) Appl. No.: 11/247,055

(22) Filed: Oct. 11, 2005

Related U.S. Application Data (60) Provisional application No. 60/617,110, filed on Oct. 8, 2004.

(51) Int. Cl.
*A01K 31/07* (2006.01)
*A01K 1/03* (2006.01)

(52) U.S. Cl. .................. 119/453; 119/472; 119/474; 119/482; 119/489; 119/491; 119/496; 119/499

(58) Field of Classification Search ......... 119/416–420, 119/452–458, 472–476, 479, 482, 483, 485, 119/487, 489–492, 496, 498, 499; 206/509, 206/511, 503, 504; 220/4.26, 23.6; D30/108; 292/303, DIG. 15, DIG. 17, DIG. 61
See application file for complete search history.

(56) References Cited

U.S. PATENT DOCUMENTS

| | | | |
|---|---|---|---|
| 2,799,245 A * | 7/1957 | Ruggiero et al. ............ 119/794 |
| 3,662,713 A | 5/1972 | Sachs | |
| 4,917,047 A | 4/1990 | Wazeter, III | |
| 4,991,543 A * | 2/1991 | Silberman ................... 119/473 |
| 5,862,778 A * | 1/1999 | Matsumoto ................. 119/472 |
| 5,950,567 A * | 9/1999 | Sheaffer et al. ............. 119/477 |
| 6,161,255 A * | 12/2000 | Garrett ......................... 16/284 |
| 6,553,939 B1 * | 4/2003 | Austin et al. ................ 119/455 |
| 6,832,580 B2 * | 12/2004 | Marchioro ................... 119/452 |
| 6,971,208 B2 * | 12/2005 | Krueger ...................... 52/106 |

FOREIGN PATENT DOCUMENTS

EP          0 546 925 B1       1/1996

* cited by examiner

*Primary Examiner*—T. Nguyen
(74) *Attorney, Agent, or Firm*—Margaret Polson; Patent Law Offices of Rick Marin, P.C.

(57) ABSTRACT

Configurable animal housing (caging) is arranged from an assortment of modules consisting of interchangeable frame cores, interstages, walls and divider panels that address a broad spectrum of animal housing needs. Various configurations include both open living and enrichment areas as well as isolation housing and are easily achieved using a quick-disconnect approach to assembly. Animal resistant lock assemblies hold modules together and use a common key to permit rapid changes of configuration without tools. Systems can address configurations for wall mounting, mobile racking, individual, and group housing, and almost any other configuration animal caregivers would want.

16 Claims, 14 Drawing Sheets

MULTI-SPECIES ANIMAL CAGING MODULES

CROSS REFERENCE APPLICATIONS

This application is a non-provisional application claiming the benefits of provisional application No. 60/617,110 filed Oct. 8, 2004.

FIELD OF INVENTION

The present invention relates to providing medical test animals, such as monkeys, cats, dogs, rabbits, birds, and small livestock with cages that can be conveniently re-arranged into varied multi-level condo dwellings using a flexible coupling system.

BACKGROUND OF THE INVENTION

Prior art modular caging systems address problems of plumbing for water supply and drainage of sewage. U.S. Pat. No. 3,662,713 (1972) to Sachs discloses a stackable, rectangular series of cages having sloped floors, plastic clips for stacking boxes on top of one another, drainpipe plumbing, and a water supply piping arrangement.

The problems with simple stacked cages like Sachs, is that monkeys are highly intelligent, and may live to 30 years of age. Therefore, they live a more interesting life if their condo-like surroundings can be readily changed into various three-dimensional arrays.

The present invention provides interlockable cage modules using interstage connection components. Dwellings can be arranged into 3D settings with several animals sharing the inner space in the daytime, and each animal having his own separate condo at night for safety precautions. Modern plumbing modules are now separate prior art systems, which are readily attached to the present invention.

Additionally, as the experimental protocols and investigations change, the need to change the species of animal under study often changes. This invention addresses the need to house multiple species within the same framework by reconfiguring the exterior skin of the housing to suit the specific animal species being held. For example the system may be used to house primates, then changed to canine, then changed to larger animals, swine or sheep or smaller animals such as rabbits or cats.

SUMMARY OF THE INVENTION

An aspect of the present invention is to provide a modular animal cage system having a quick and easy attachment assembly to rearrange three-dimensional multi-cage dwellings.

Another aspect of the present invention is to provide a flexible coupling system between modules.

Another aspect of the present invention is to use interstage components to join cages.

Another aspect of the present invention is to provide tamper-resistant latches on the cage doors and modules that require no secondary lock and that use a universal key that can be operated wearing heavy gloves. This provides a "quick-disconnect" capability to all modules.

Another aspect of the present invention is to provide a tamper-resistant label holder for each cage.

Another aspect of the present invention is to provide a low friction easy to slide interstage door system by using rollers that will accept loads from varying angles.

Another aspect of the present invention is to provide a basic frame for a cage and a plurality of interchangeable walls and floors, as well as a simple interconnect means for a plurality of frames.

The plurality of interchangeable walls and floor is a specific advantage that permits the exterior panels to be changed to suit a wide variety of different species and make the system truly multi-species capable but specific species suitable.

Another aspect of the present invention is to provide an animal puller, which enables a rear portion of a cage to become a common area for other animals from other cages.

Other aspects of this invention will appear from the following description and appended claims, reference being made to the accompanying drawings forming a part of this specification wherein like reference characters designate corresponding parts in the several views.

The caging system is a modular cage core concept wherein the core component is a three-dimensional frame module. The module basic outline is typically a 3D rhomboid/rectangular/cube, wherein the modules fit and are held in place together to form various configurations as required by the animal caregiver. This same concept can be applied to any polygon or set of polygons that can be mated on parallel faces. The caging system uses an interface component (an interstage) that is application specific but serves to mate the core modules on the appropriate sides for the intended use. The core module can be interlocked together using various interstages to create a variety of self-supporting structures. These two concepts permit the same basic components to be used across a spectrum of application specific products, including (but not limited to); housing—both mobile condominium type as well as wall/rack mounted, play pens, group housing, housing interconnect devices and carts.

Third, the system uses a new flexible coupling mechanism that does not use conventional "rigid link" devices like toggle clamps with "j-hooks", cam locks pin-and-clasp, fixed bracket or toggle couplers. This mechanism uses any flexible medium (such as cable, chain, belting, or rope) attached to any form of mechanical force multiplier (such as a jack screw, cam, lever or toggle) to draw cage/housing assemblies together and hold them in a joined condition, or to attach them to a stationary object for anchoring, such as to the wall or floor.

Fourth, is a rotary tongue latch. This latch is monkey proof and uses a hex/square key to actuate it. In various configurations it can latch onto a (nader type) pin or a hole or slot, and/or into a recess or saddle, any/all of which protect the engaged portion of the tongue from being tampered with by the animals.

Fifth, is placement of a cardholder within the interior of the cage assembly, in this case specifically the excrement pan door but any other applicable surface could be used. Historically, cardholders have been placed on the outer surfaces of the cage with small structures, guarding or covers to keep the primates from tampering with the card itself. By putting the card holder itself in the door or similar panel (like a drawer front) that offers a frame, access to the card can be restricted by the frame so that it can only be accessed when the door is open thereby keeping the monkey from getting to it.

Sixth, is to utilize a "pocket door" approach to horizontal interstage divider walls that use rollers or a similar moving bearing device on opposing ends of the moving panel. This makes it reversible (so that can be installed upside down or right/left configuration) and permits it to be used on an angle (in some of the envisioned polygon configurations) or completely on its side. Historically, because of the cage washing and autoclaving, moving dividers worked on fixed slides that are difficult to use because of high friction.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
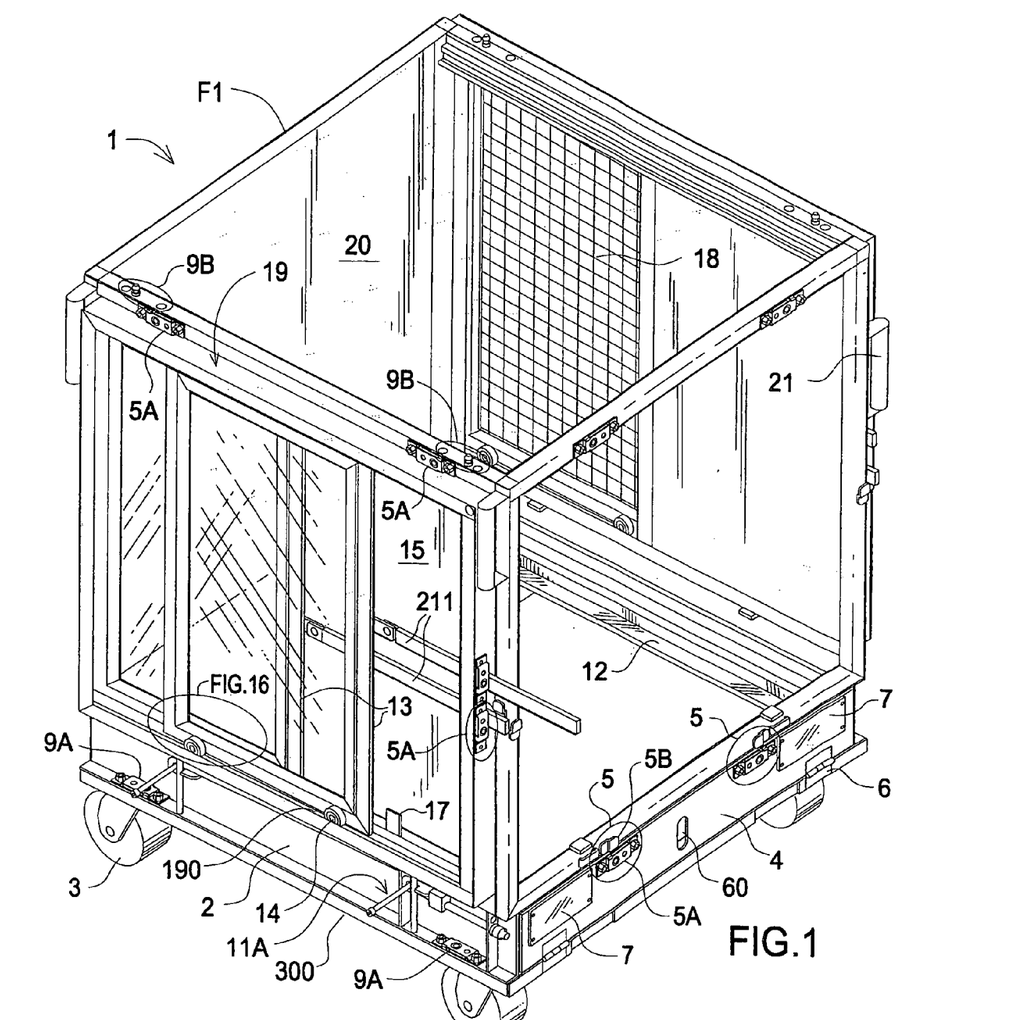
FIG. 1 is a top perspective view of a cage module mounted to an interstage.

Referring first to FIG. 1 a cage 1 is a square, but could be any polygon. Frame F1 consists of joined members (tube, rod, bar, structural shapes), which provide a support structure for wall, interstage, floor, or ceiling modules. An interstage 2 supports cage 1, wherein locks 9A, 9B releasably lock all adjoining vertically stacked members together. Optional wheels 3 permit rolling the assembly around, wherein a base 300 supports the interstage 2.

The vertical interstage has a door 4 with hinges 6 and sewage hole 60. A transparent plate 7 allows a name and data card to be seen therethrough. A lock assembly 5 is a tamper resistant lock to keep the door 5 locked. Assembly 5A has a latch 5P which rotates into tab 5B to lock, see FIGS. 6,7. The vertical interstage 2 has an inside flange 12 to support a floor, FIG. 3A item 312. Below this flange is another flange, which supports the poop tray FIG. 2 item 201. And below that a flange and clip 12A supports a ceiling for an underneath cage module.

Figure 4A:
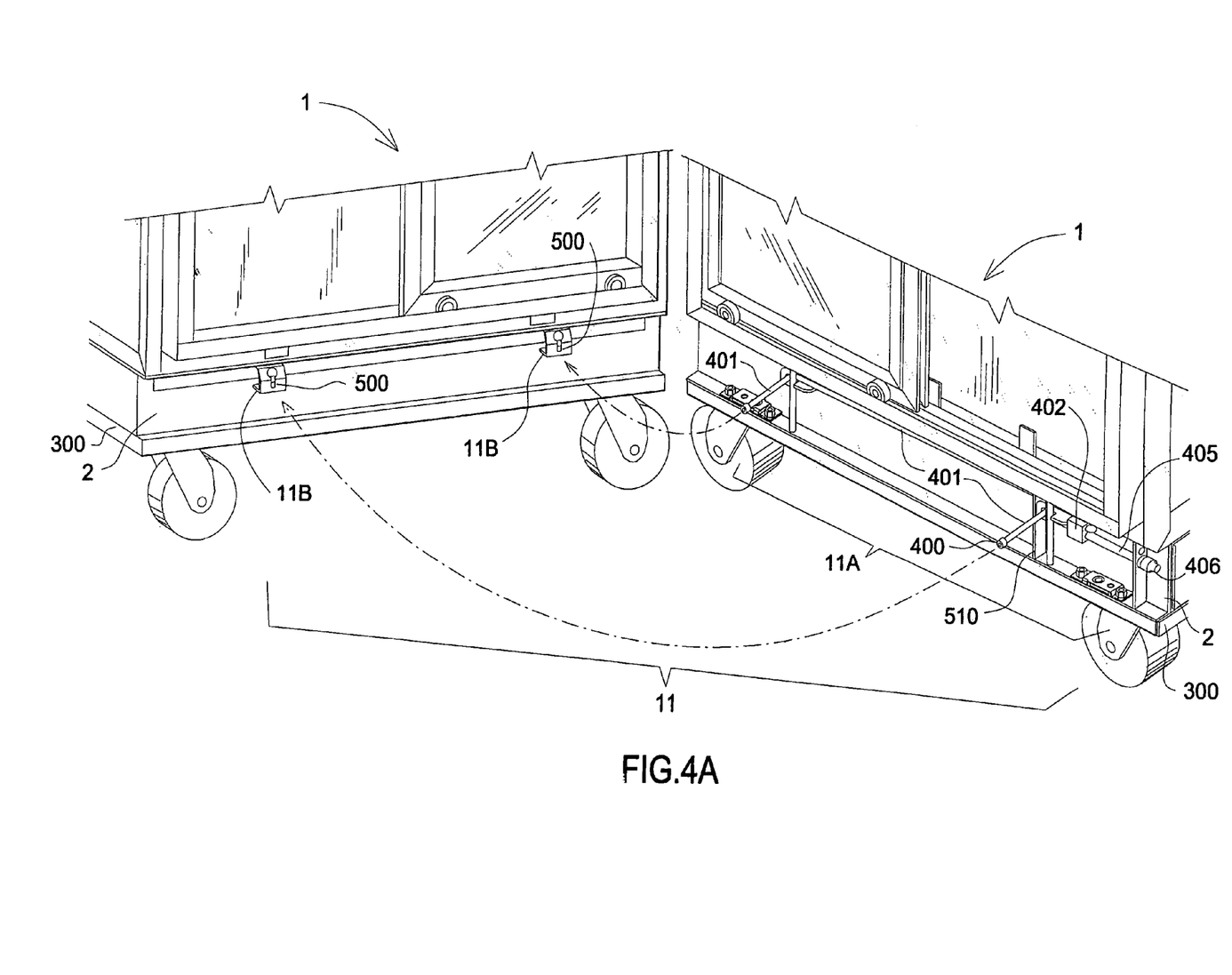
FIG. 4A is a close-up view of the coupler assembly between interstages.

Each cage assembly (combination of modules to be joined) will have a flexible coupling mechanism integrated into it to hold multiple cage assemblies together. In the current embodiment this coupling mechanism is located on the side of the vertical interstage and consists of male member 11A and female member 11B as shown in FIG. 4A. Also, see FIGS. 4B and 4C. Alternatively, it may be mounted within or on any convenient adjacent or parallel surfaces or within the frame itself, and the mating members do not have to be male and female as they also include but are not limited to a post and loop, hook and eye, clevis and pin or several other similar connections intended for tension loads.

Each cage 1 has wall support frames F1. Horizontal interstage 19 is supported by frame F1. Each horizontal interstage 19 can be custom configured with combinations of divider walls to provide increasing level of introduction being opaque (smell) wall 20, transparent (visual) wall 13, and two screens (or bars, not shown) 18 fine (safe grooming) and coarse (full touch). Bars 211 are used to open/close walls 13. Pocket panels 15 are stationary. Grooved rollers 14 support various wall segments see FIG. 16. Wall segments can be full wall or partial wall segments as shown. Handles 21 facilitate moving the cage 1.

Figure 2:
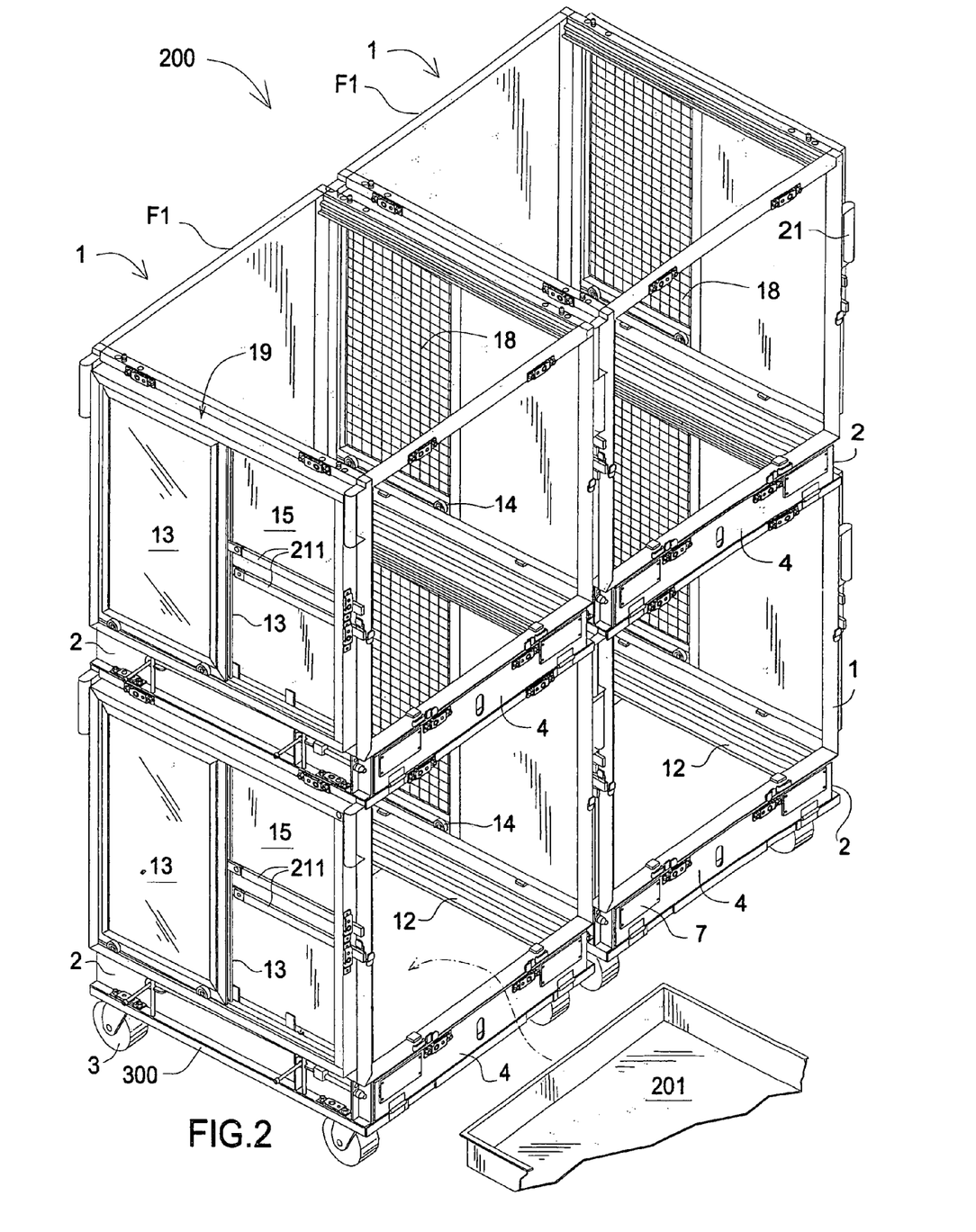
FIG. 2 is a top perspective view of a four-cage assembly.
Figure 3A:
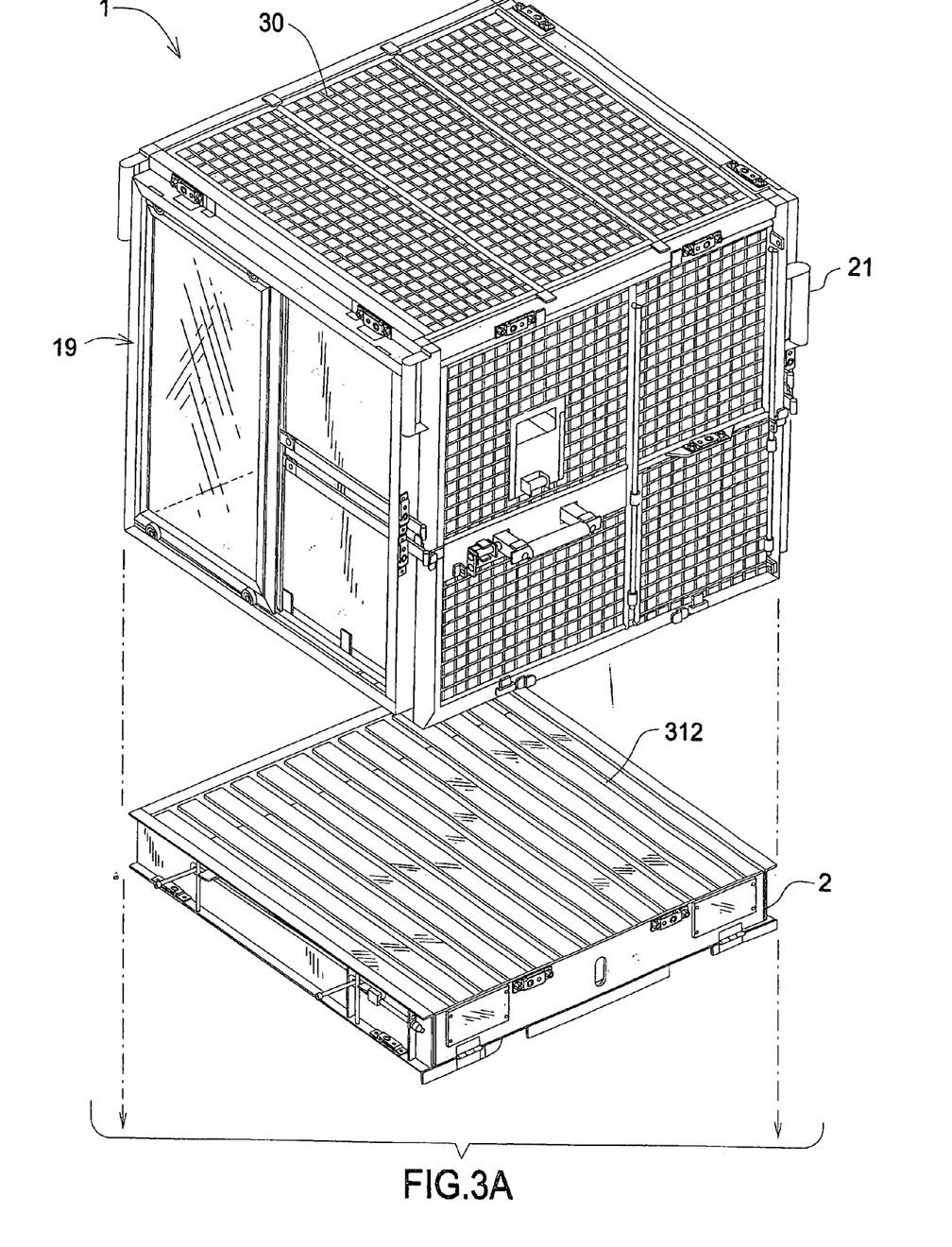
FIGS. 3A, 3B are an exploded view of a two-cage assembly.

Referring next to FIG. 2 tray 201 can be placed on flange 12 in any cage 1, where the FIG. 3A floor 312 is above the tray 201. A typical living quarter 200 consists of four cages 1. By opening doors 4 and inserting or removing floors 201 and/or inside divider walls 13 or 18, and ceiling 30 the living quarter 200 can be quickly converted from four isolation cages 1 to one large multi-animal living space. The living quarter 200 can be modularly expanded in all directions except from the base 300 down.

Figure 3B:
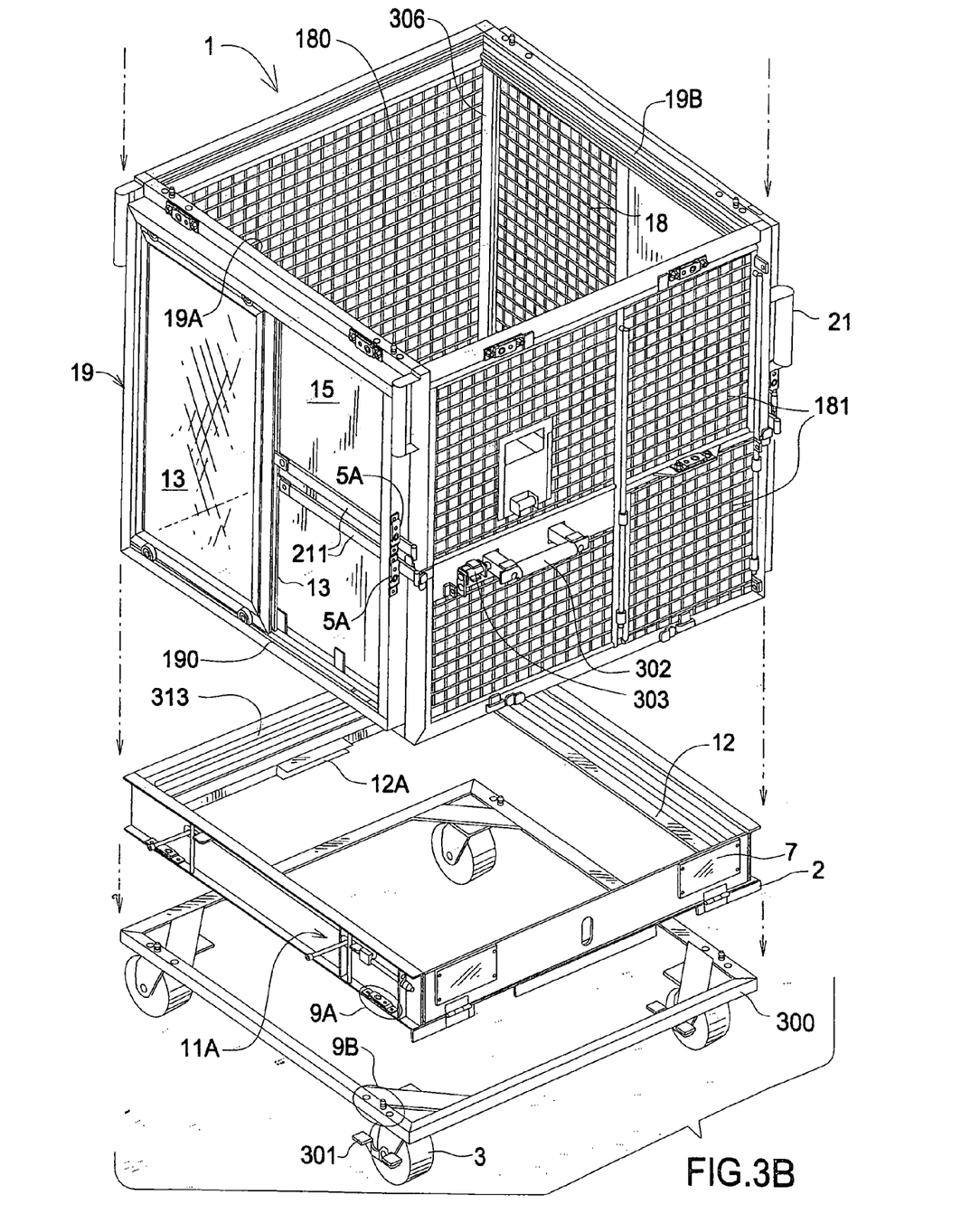

Referring next to FIGS. 3A, 3B two cages 1 are stacked vertically. A roof consists of one screen 30. The upper cage 1 has a removable grid floor 312 that is supported in groove 313, shown in FIG. 3B. Clip 12A supports a removable or sliding roof for a cage below (not shown).

An animal retraction squeeze assembly consists of a solid wall panel 180 which slides in tracks 19A, 19B. A rod attaches the wall panel 180 to the handle 302. To retract an animal the latch 303 is released, and the handle 302 is pulled out. Quarter panels 18 may be solid, transparent or screens as shown (or bars not shown) and serve as a sliding door.

The lower (vertical) interstage 2 is attached to the base 300 via lock assemblies 9A,9B. The wheels 3 may have brakes 301.

Figures 4B, 4C:
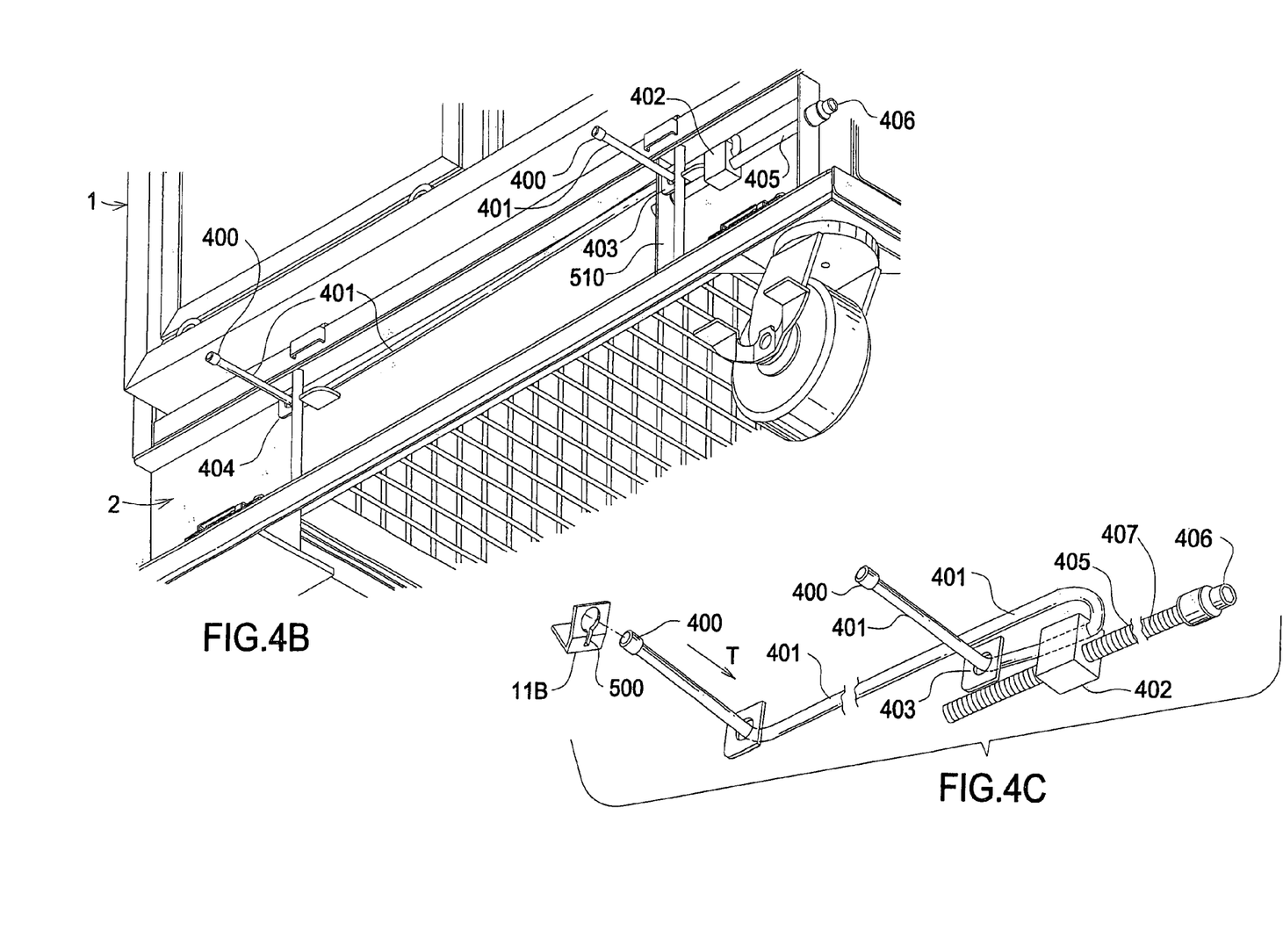
FIG. 4B is a detailed view of the coupler cable subassembly.
FIG. 4C is a perspective view of the cabling.

Referring next to FIGS. 4A, 4B, and 4C a cage assembly coupling system 11 consists of stationary female keyholes 11B, which receives male assembly 11A. Male assembly 11A consists of a cable 401 with end beads 400 that fit into locking grooves 500. Anchors 403, 404 secure the cable 401 to the frame 510. The bolt 405 has threads 407, wherein the bolt 405 turns in frame 510. As the turning head 406 is rotated, the tension block 402 travels toward the turning head 406, thereby pulling 401 taut and locking the end beads 400 in locking grooves 500.

Figure 5:
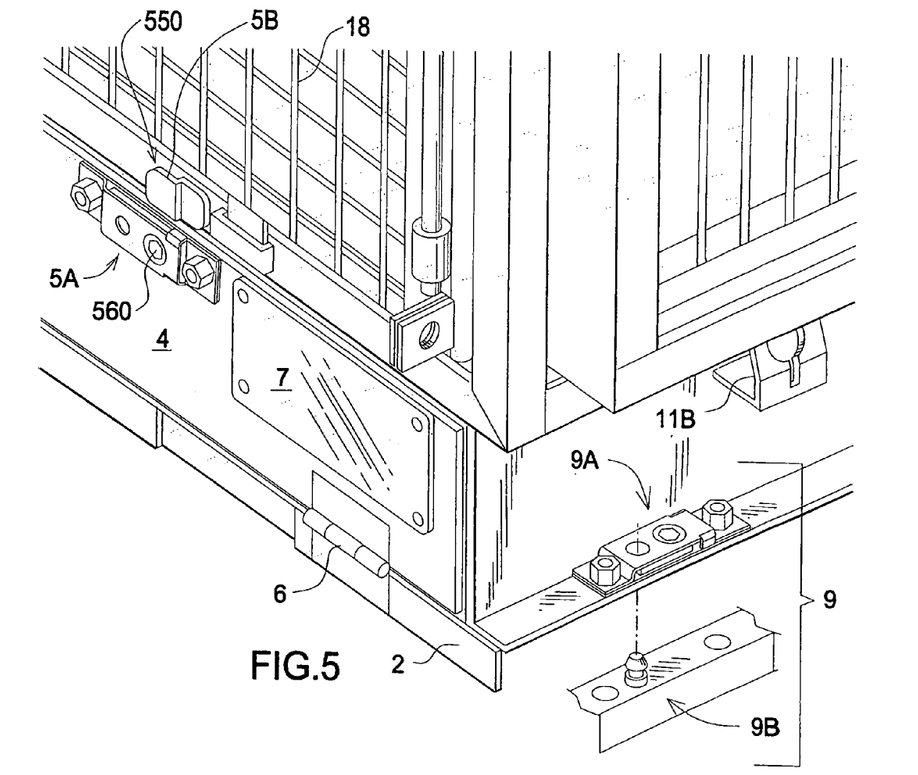
FIG. 5 is a top perspective view of a corner joint between an interstage and a cage.
Figure 6:
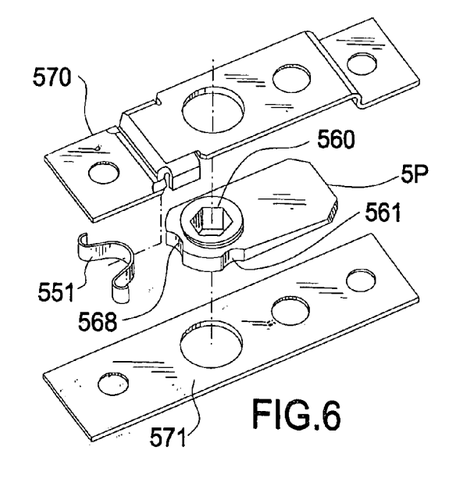
FIG. 6 is an exploded view of a solid tongue latch.
Figure 7:
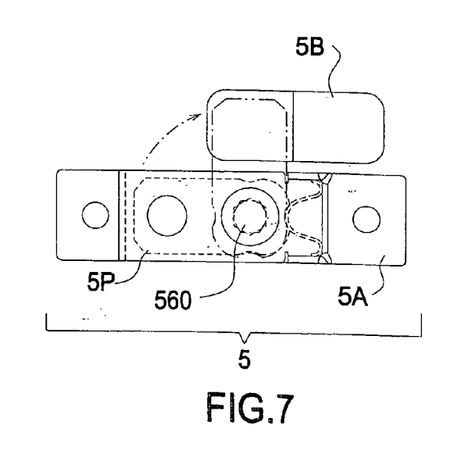
FIG. 7 is a side plan view of the FIG. 6 solid tongue latch.
Figure 8:
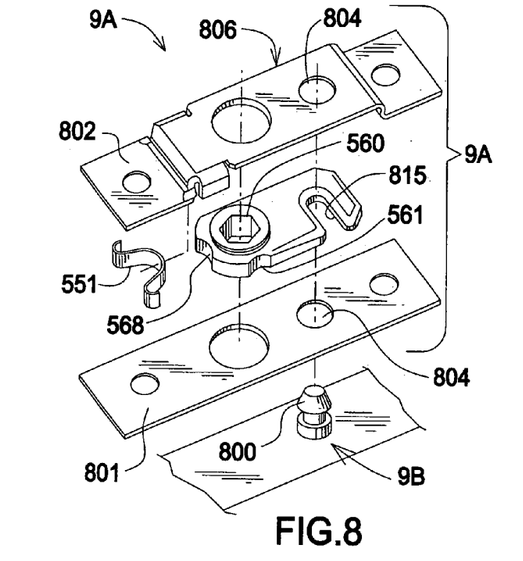
FIG. 8 is an exploded view of a slotted tongue latch with nader pin typical of a tension connection on any assembly.
Figure 9:
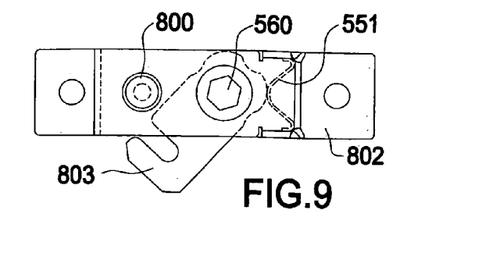
FIG. 9 is a top plan view of the FIG. 8 assembly.

Referring next to FIGS. 5,6,7 the tamper-resistant interstage door lock assembly 5, consisting of members 5A,5B is shown. Tongue 5P locks into groove 550, wherein spring 551 maintains tongue 5P in the groove 550 via detent 561 (or open detent 568) until a human puts a key into hole 560 to rotate the tongue 5P to open or close the lock. The plates 570, 571 form a receiving housing for the tongue 5P.

Referring next to FIGS. 5,8,9,10 the vertical lock assembly 9 is shown consisting of male member 9B and female member 9A. Male member 9B has a locking prong 800.

Figure 10:
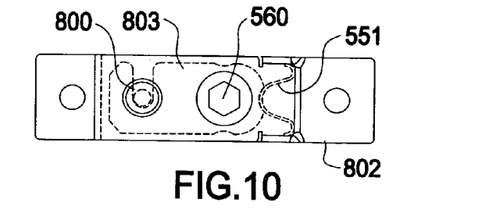
FIG. 10 is a top plan view of the FIG. 9 assembly locked.

Plates 801, 802 form a housing with a recess 806 for latch 803. Latch 803 locks into prong (nader pin) 800 as shown in FIG. 10. A key is placed in hole 560 to open (FIG. 9) or close (FIG. 10) the lock assembly 9. Groove 815 accepts the prong 800. Hole 804 accepts the prong 800 from the lower module.

Figure 11:
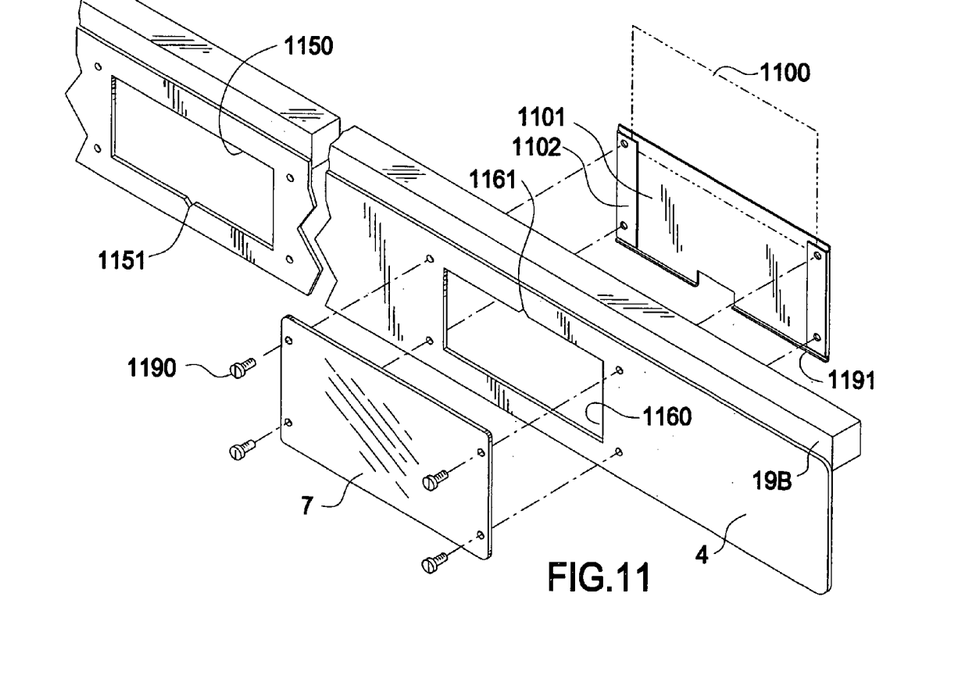
FIG. 11 is an exploded view of the card holder for the interstage door.

Referring next to FIG. 11 when the door 4 is open a card 1100 can be placed in panel 1101 via flanges 1102. When the door 4 is closed the frame member 19B prevents the animal from gaining access to the card 1100. Ledge 1191 supports and protects the card 1100. Screws 1190 fasten the window 7 and the panel 1101 to the door 4. Opening 1150 has a pointer notch 1151 for a lower cage, and opening 1160 has a pointer notch 1161 to an upper cage. This arrangement provides a flexible and tamper-resistant labeling system for the caretakers.

Figure 12:
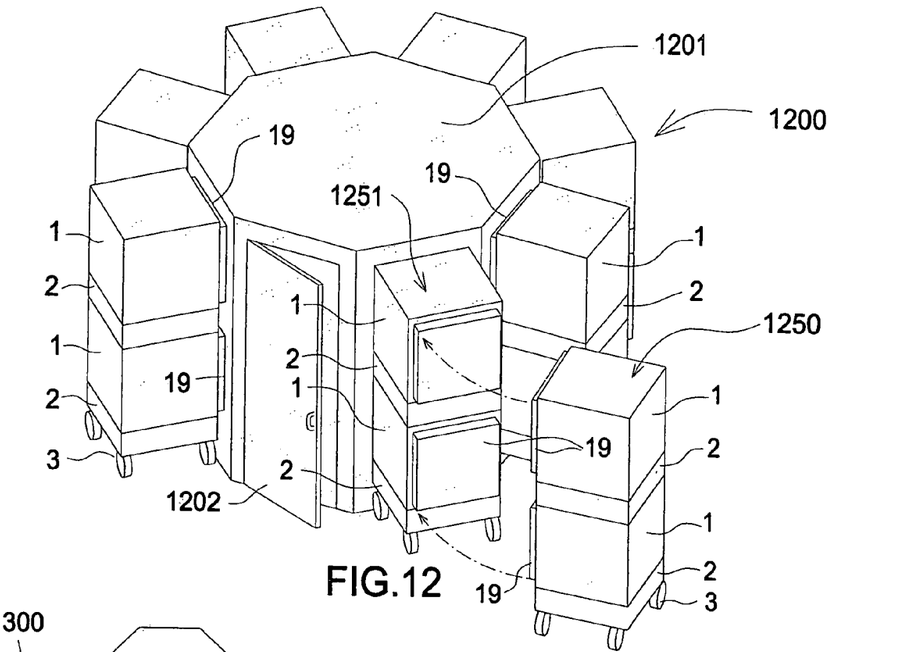
FIG. 12 is a top perspective view of a multi-cage environmental system.

FIG. 12 shows custom living quarters 1200 having a central living room 1201 with a door 1202. Cages 1 and interstages 2 are stacked. Assembly 1250 is shown in two stages being installed (arrows INSTALL) onto assembly 1251. Each stacked assembly and/or individual cage can be added or deleted. Animals can be isolated at night in their cages 1. A variety of interactive activities between animals can be quickly created as shown in FIGS. 2, 3A, and 3B.

Figure 13:
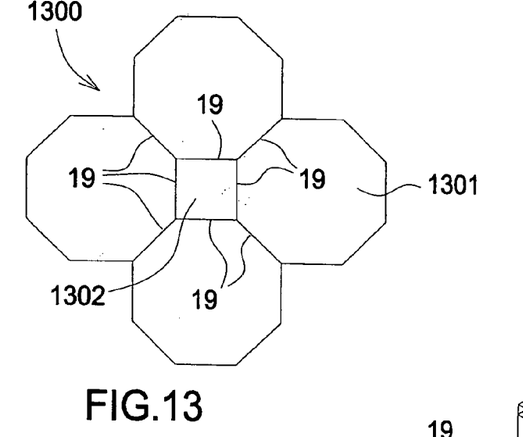
FIG. 13 is a plan view (top or front) of one embodiment of a custom configured multi-cage system using interconnected polygons.

FIG. 13 shows a custom living quarter 1300 having a central access chamber 1302 and octagonal cages 1301. Interstages 19 connect the various modules. Depending on the application, this view could be either a top planer or a front planer view of polygon cages in a cluster with interstages 19 used on an angle, horizontally and/or vertically.

Figure 14:
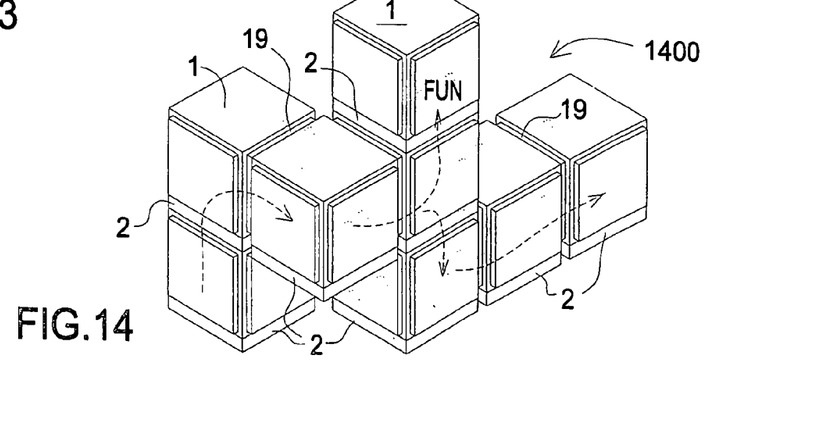
FIG. 14 is a perspective view of one embodiment of a custom configured multi-cage 3D system.

FIG. 14 shows a custom living quarter 1400 having a 3D assembly of cages 1 and interstages 2. Arrows FUN show the paths of interacting animals when the appropriate inside walls and floors are temporarily removed.

Figure 15:
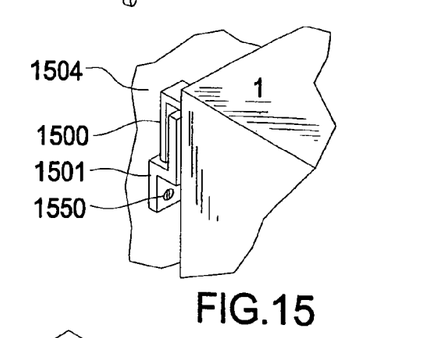
FIG. 15 is a perspective view of a wall hanging bracket.

FIG. 15 shows a Z bracket 1501. The cage 1 has an L-shaped bracket 1500, firmly mounted such as by welding. Bracket 1500 supports the cage 1 on walls 1504 as shown with the L-shaped bracket 1500 hanging from the Z-shaped bracket 1501. The Z bracket 1501 is bolted via bolts 1550 to the wall 1504.

Figure 16:
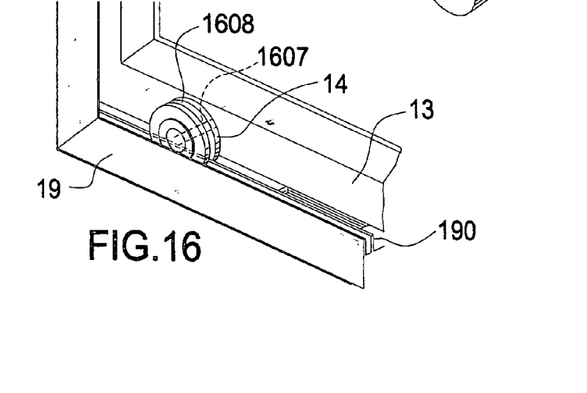
FIG. 16 is a top perspective detail view of a supporting wheel of a wall segment.

In FIG. 16 the base of interstage 19 has a ridge type track 190 that is received by a groove 1608 in the wheel 14. An axle 1607 supports the wheel 14.

Figures 17, 18:
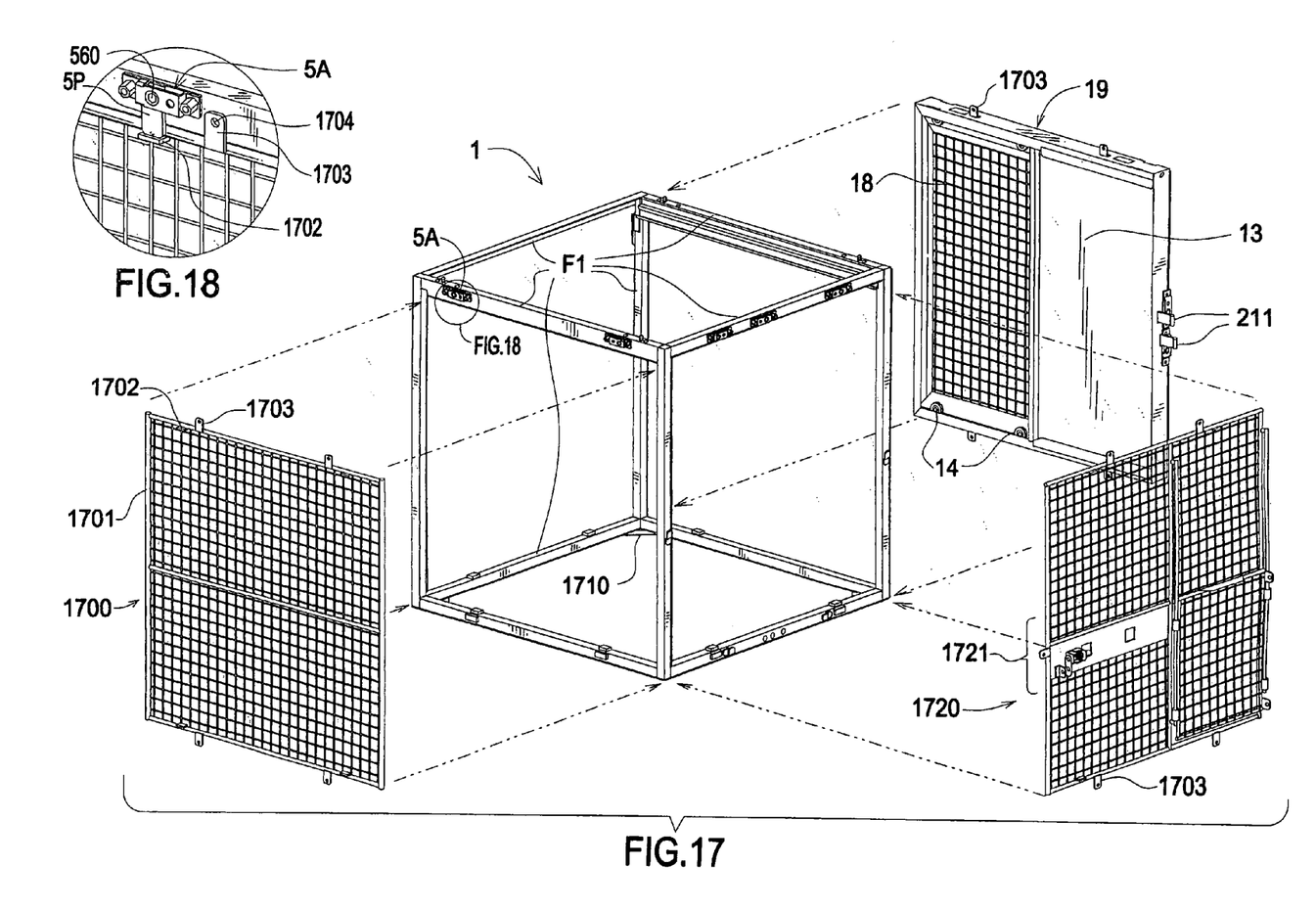
FIG. 17 is an exploded view of the FIG. 1 embodiment, showing the horizontal interstage separated from the basic frame.
FIG. 18 is a close up view of a latch for a wall of the FIG. 17 embodiment.

Referring next to FIGS. 17 and 18 a cage 1 has a horizontal interstage 19 fastened to frame members F1 via a tab 1703, which has a hole 1704, and screws (not shown). Alternatively instead of the tab 1703 a lock assembly 5 shown in FIGS. 5, 6, 7 could be used to fasten the interstage 19 to the frame members F1.

The walls 1700, 1720 could likewise either be fastened with tabs 1703 or (more expensive) lock assemblies 5.

FIG. 18 shows a flange 1702 on the wall 1700 which abuts the tongue 5P, thereby blocking an upward movement of wall 1700. The tongue 5P covers the frame 1701 to prevent an outward movement of wall 1700.

Figure 22:
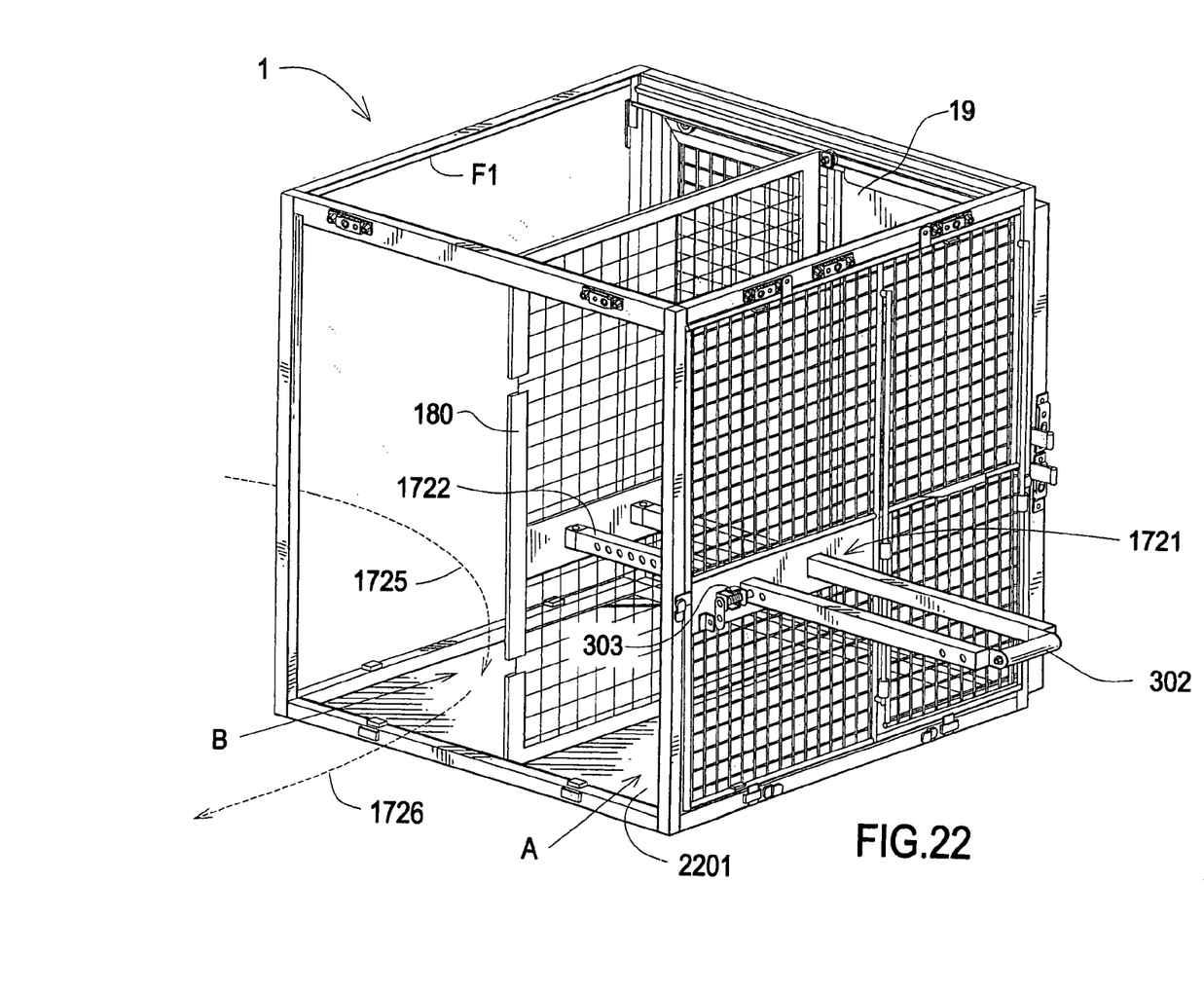
FIG. 22 is a front perspective view of an animal puller, which allows a rear portion of a cage system to be used as a common area for animals in adjoining cages.

A welded stainless steel brace 1710 can support a floor panel such as panel 2201 shown in FIG. 22.

The wall 1720 has an animal retraction squeeze assembly 1721 consisting of a slidable rear wall 180 (see FIG. 22). A rod 1722 converts the wall 180 to the handle 302. To retract one animal the latch 303 is released, and the handle 302 is pulled out as shown in FIG. 22. Thus, an animal(s) can be moved to compartment A while other animals can use compartment B as a common area from adjoining cages (not shown) as indicated by arrows 1725, 1726.

Figure 19:
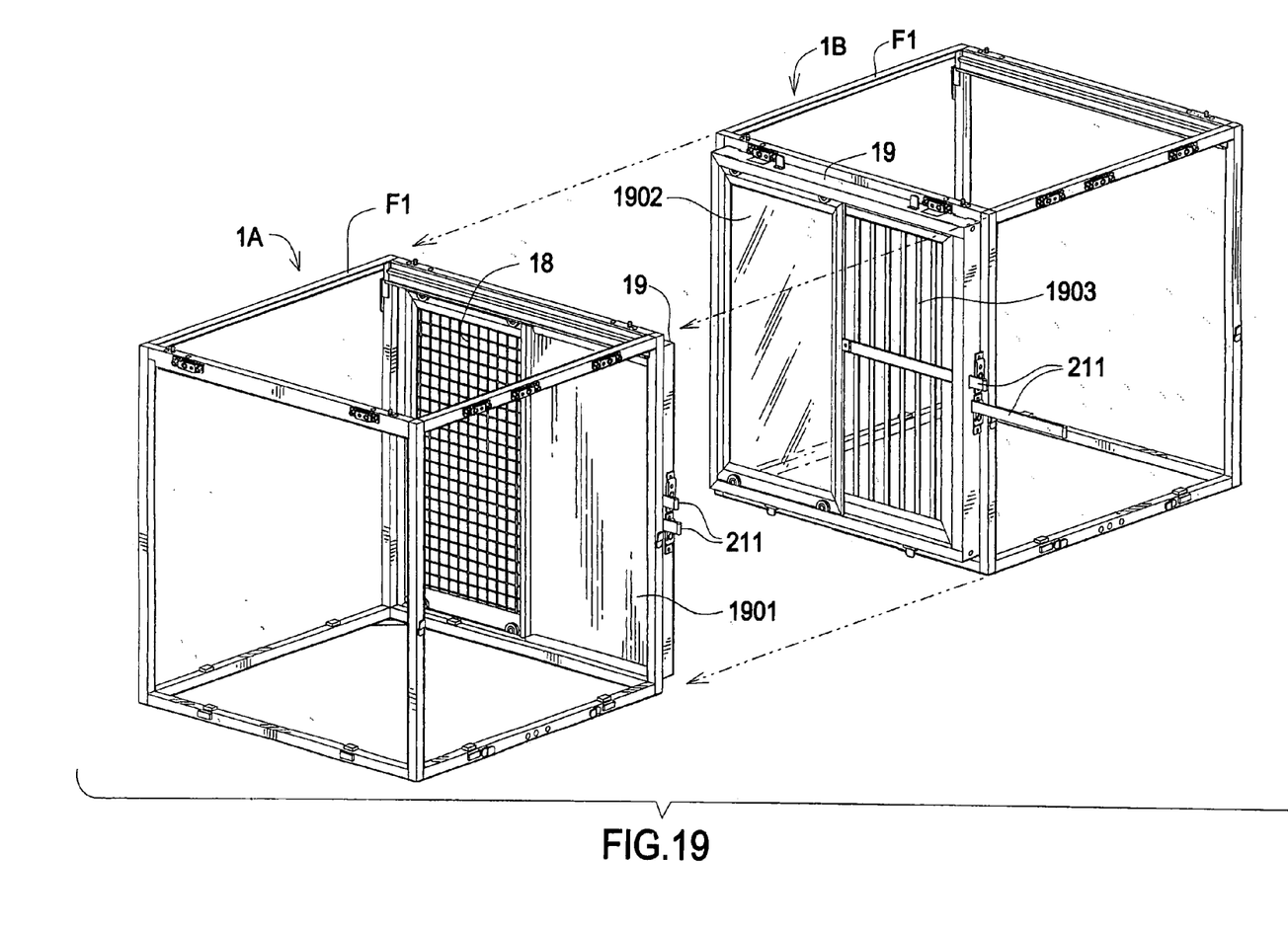
FIG. 19 is a front perspective view of two FIG. 1 embodiment cages with face to face horizontal interstages which can provide a variety of panel selections between the cages.

Referring next to FIG. 19 each cage 1A, 1B has a vertical interstage 19. Any number of different types of sliding wall panels can be inserted into the interstages 19. Examples shown are a mesh 18, an opaque 1901, a transparent 1902, and bars 1903. By manipulating arms 211 multiple combinations of cage to cage animal exposure can be provided.

Figure 20:
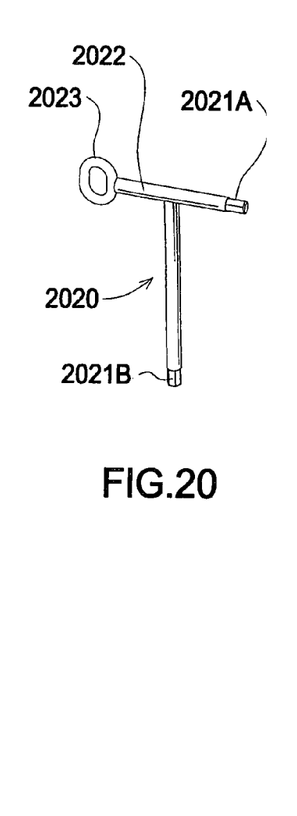
FIG. 20 is a front plan view of a one key fits all key for the FIG. 1 embodiment.

FIG. 20 shows a key 2020 which can fit all lock assemblies 5, 9A on a cage. A working end 2021A, 2021B may be a hex head. T handle 2022 or key handle 2023 can be used to twist either end 2021A, 2021B.

Figure 21:
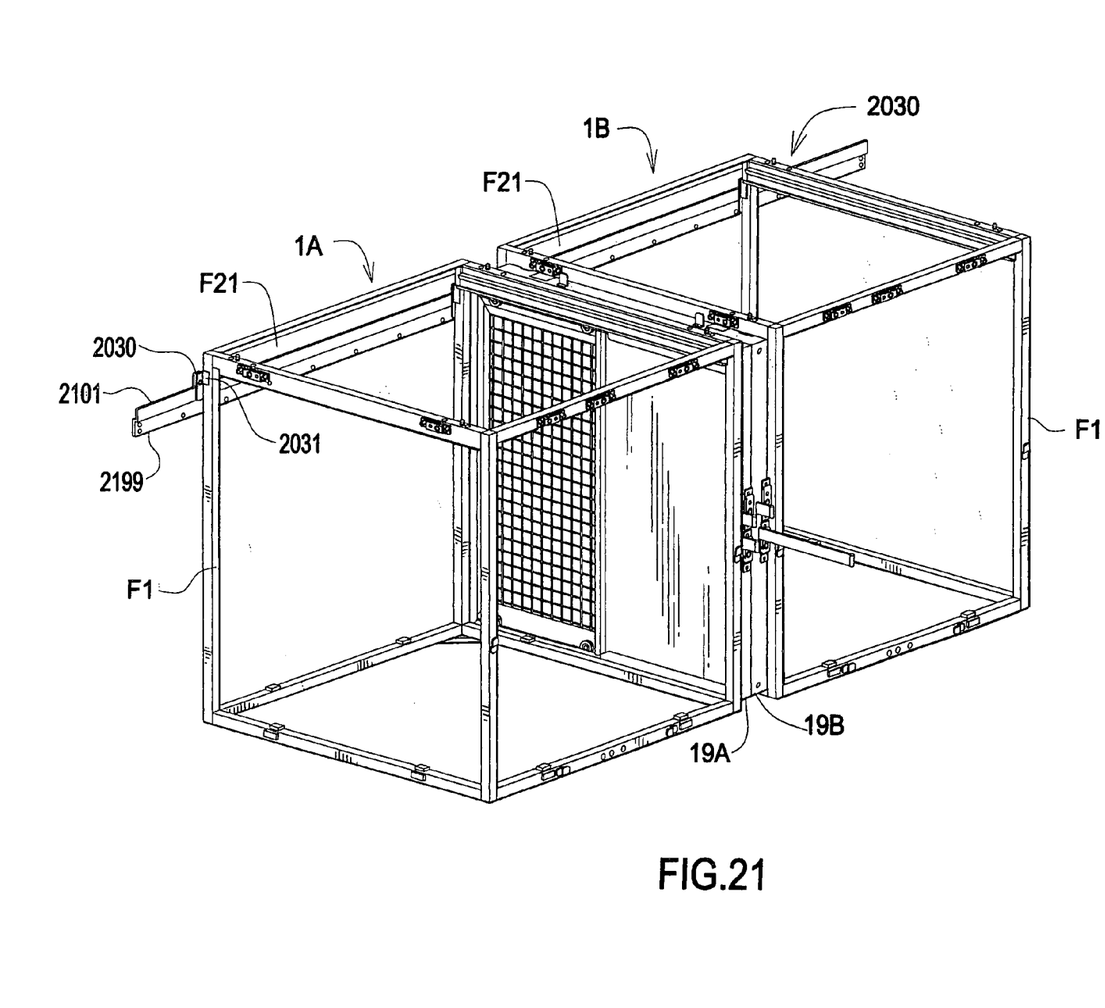
FIG. 21 is a front perspective view of an alternate means to join together two cages.

Referring next to FIG. 21 cages 1A, 1B having facing horizontal interstages 19A, 19B. An alternate means to join cages 1A, 1B together consists of placing a mounting bracket 2101 into a groove 550 from a member 5B (FIG. 5) which would be mounted at the rear of frame member F21. Then a lock 2030 on the bracket 2101 prevents the cages 1A, 1B from separating via tab 2031. The bracket 2101 may be mounted to a wall support 2199 to keep the cages 1A, 1B above the floor.

Figure 23:
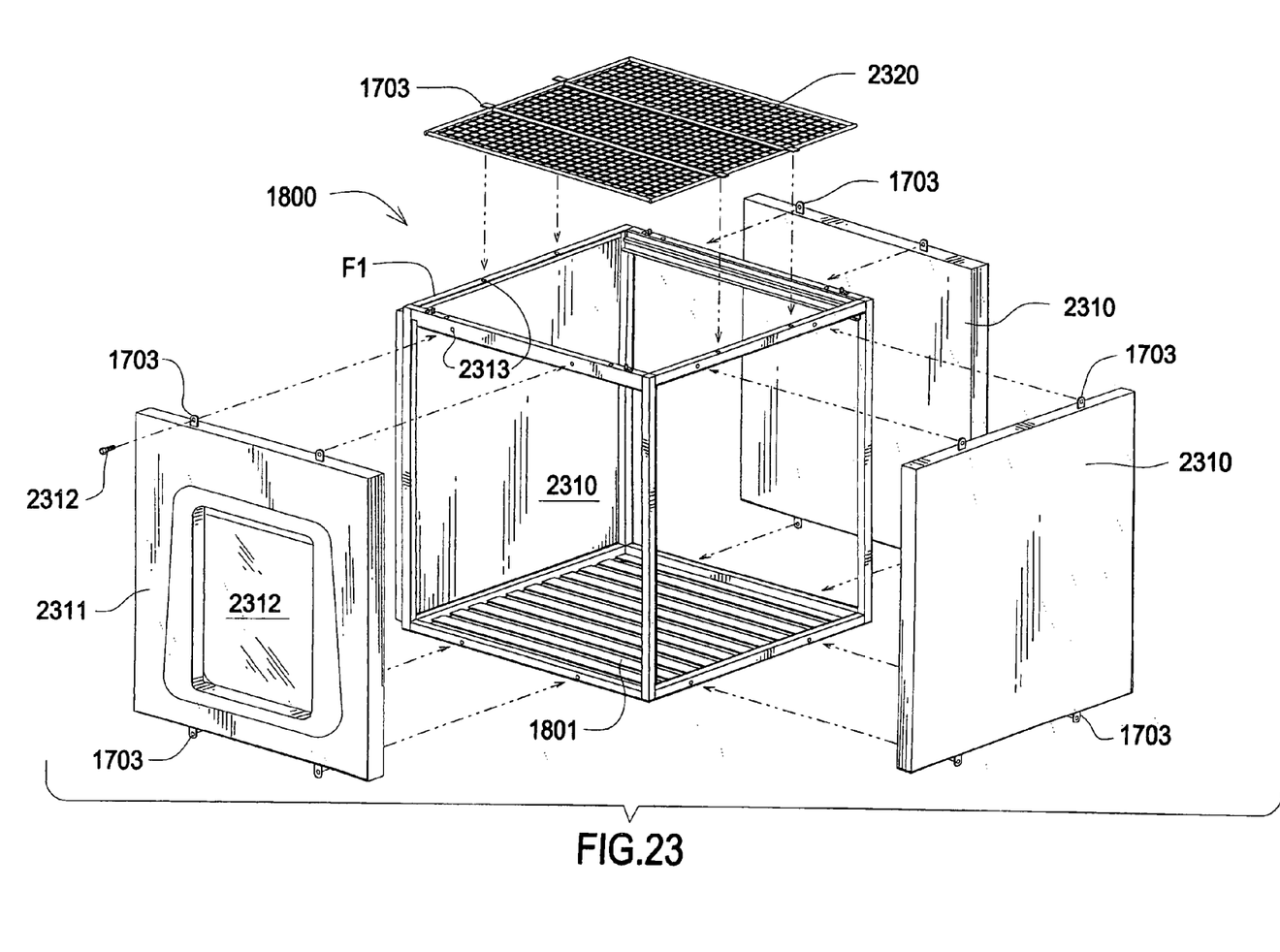
FIG. 23 is an exploded view of another embodiment basic cage with interchangeable panels.

Referring next to FIG. 23 a cage 1800 is made of frame members F1. No interstages are provided. These cages could be joined as shown in FIG. 21. Each cage 1800 has interchangeable floors 1801 that rest on braces 1710 (See FIG. 17). Walls 2310 may be of any design such as solid or transparent. Wall 2311 has a doggy door 2312. Tabs 1703 from FIG. 18 can be used to inexpensively support the walls 2310, 2311 via screws 2312 into holes 2313. Ceiling panel 2320 is shown as a mesh. Instead of Tabs 1703, latches 5 could be used.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A cage system comprising:
    a cage body having a polygon shape with a flat side;
    an interstage means functioning to removeably mate a first cage body to a second cage body;
    a removable wall means functioning to alternately provide and deny access between the first and second cage bodies;
    a horizontal interstage means functioning to support the removable wall means; and
    wherein the horizontal interstage means further comprises a track having a vertical ridge which fits into a central groove of a wheel, said wheel supported by recesses in the horizontal interstage means, wherein a base of a wall panel for the cage body is received in the central groove to enable a sliding of the wall panel relative to the horizontal interstage means.

2. The cage system of claim 1, wherein the cage body further comprises a frame means functioning to support a wall.

3. The cage system of claim 2, wherein the interstage means further comprises a vertical interstage means having a module functioning to form a floor.

4. The cage system of claim 2, wherein the vertical interstage means further comprises a support for a cage body above it, the vertical interstage means having an excrement door for servicing the cage body and having a lock between the vertical interstage means and the cage body.

5. The cage system of claim 4, wherein the excrement door further comprises a card holder with a transparent face and a back with an entry slot, wherein said entry slot further comprises a ledge means functioning to block the entry slot when the door is closed.

6. The cage system of claim 4, wherein the vertical interstage lock further comprises a stationary male prong mounted on a lower interstage member which fits through a hole in a bracket mounted on the upper cage body frame, wherein a latch in the bracket is rotatable by a key to engage the male prong.

7. The cage system of claim 4, wherein the excrement door lock further comprises a bracket mounted on the cage body, said bracket having a locking groove, a rotatable tongue mounted behind a plate on a vertical interstage, wherein a key can be used to rotate the rotatable tongue to a locked/unlocked state with a spring bias securing the tongue in either the locked or unlocked state.

8. The cage system of claim 2, wherein the interstage means further comprises a flexible coupling system for an adjoining interstage means, wherein a first interstage means has a pair of stationary female keyholes, and wherein a second interstage means has a cable with ends that fit into the female keyholes, and wherein a tension block means on the second interstage means functions to provide a taut and locked mode of the cable ends in the keyholes.

9. The cage system of claim 8, wherein the tension block means further comprises a threaded bolt anchored to the second interstage means which draws the cable taut.

10. The cage system of claim 2, wherein a wall further comprises an animal retraction assembly which has a rear wall movable to a mid cage location to provide a common access area at a rear of the cage for an adjoining cage.

11. The cage system of claim 2, wherein the frame means has a groove to connect to a bracket which extends to a second cage to provide a coupling of the cages along the bracket.

12. The cage system of claim 11, wherein the bracket has a lock to hold the cages against one another.

13. The cage system of claim 2, wherein the wall has a tab and a screw to attach to the frame means.

14. The cage system of claim 2, wherein the frame means has a latch to attach the wall to the frame means.

15. The cage system of claim 1 further comprising adjoining first and second cages, each having a horizontal interstage means, wherein a wall panel can be positioned by sliding to provide a plurality of wall combinations between the cages.

16. The cage system of claim 1 further comprising a vertical interstage means between adjoining side by side cages.

* * * * *